(12) United States Patent
Li et al.

(10) Patent No.: US 11,678,751 B2
(45) Date of Patent: Jun. 20, 2023

(54) APPLICATION OF DISPENSING PROCESS IN GARMENTS, SLEEPING BAGS AND OTHER SEWN PRODUCTS

(71) Applicant: HIGH ROCK RECREATION PRODUCTS CO., LTD., Tianjin (CN)

(72) Inventors: Hongyong Li, Tianjin (CN); Hui Liu, Tianjin (CN); Qing Li, Tianjin (CN)

(73) Assignee: HIGH ROCK RECREATION PRODUCTS CO., LTD., Tianjin (CN)

( * ) Notice: Subject to any disclaimer, the term of this patent is extended or adjusted under 35 U.S.C. 154(b) by 288 days.

(21) Appl. No.: 17/007,612

(22) Filed: Aug. 31, 2020

(65) Prior Publication Data
US 2021/0212482 A1 Jul. 15, 2021

Related U.S. Application Data

(60) Provisional application No. 62/960,440, filed on Jan. 13, 2020.

(30) Foreign Application Priority Data
Jan. 13, 2020 (CN) .......................... 202010030473.1

(51) Int. Cl.
| A47G 9/08 | (2006.01) |
| B32B 3/08 | (2006.01) |
| B32B 5/26 | (2006.01) |
| B32B 7/14 | (2006.01) |
| B32B 37/00 | (2006.01) |
| B32B 37/12 | (2006.01) |

(52) U.S. Cl.
CPC ............... *A47G 9/086* (2013.01); *B32B 3/08* (2013.01); *B32B 5/26* (2013.01); *B32B 7/14* (2013.01); *B32B 37/0084* (2013.01); *B32B 37/1292* (2013.01); *B32B 2597/00* (2013.01)

(58) Field of Classification Search
CPC .. A47G 9/086; B32B 3/08; B32B 5/26; B32B 7/14; B32B 37/0084; B32B 37/1292
See application file for complete search history.

(56) References Cited

U.S. PATENT DOCUMENTS

| 10,271,599 B2* | 4/2019 | Park ...................... B29C 65/526 |
| 2008/0264335 A1* | 10/2008 | Roup ...................... D06C 3/00 118/300 |
| 2009/0155543 A1* | 6/2009 | Fowler ................. A41D 31/065 428/179 |
| 2017/0266919 A1* | 9/2017 | Seok ........................ B32B 7/14 |

* cited by examiner

*Primary Examiner* — Joanna Pleszczynska
(74) *Attorney, Agent, or Firm* — Dragon Sun Law Firm, PC; Nathaniel Perkins

(57) ABSTRACT

The present application provides a fabric layer, comprising: an outer layer on which a plurality of first connecting portions are arranged; and, an inner layer on which a plurality of second connecting portions are arranged, wherein the first connecting portions on the outer layer are bonded to the corresponding second connecting portions on the inner layer by dotted sol to form fabric layer connecting portions, so that a chamber is formed by every two adjacent fabric layer connecting portions, the outer layer and the inner layer to accommodate a stuffing. The present application further provides a sleeping bag comprising the fabric layer. With such an arrangement, windproof, waterproof and down-proof effects can be achieved.

9 Claims, 5 Drawing Sheets

```
┌─────────────────────────────────────────────────────────────────┐
│ Apply the dotted sol onto the first connecting portions on the │
│ outer layer and the second connecting portions on the inner    │
│ layer                                                           │
└─────────────────────────────────────────────────────────────────┘
                                │
                                ▼
┌─────────────────────────────────────────────────────────────────┐
│ Place the first baffle liner portions on the first connecting  │
│ portions with the dotted sol applied thereon, so that the first│
│ connecting portions on the outer layer are aligned with the    │
│ first baffle liner portions                                     │
└─────────────────────────────────────────────────────────────────┘
                                │
                                ▼
┌─────────────────────────────────────────────────────────────────┐
│ Press the outer layer and the first baffle liner portions which│
│ are superimposed together                                       │
└─────────────────────────────────────────────────────────────────┘
                                │
                                ▼
┌─────────────────────────────────────────────────────────────────┐
│ Place the second baffle liner portions on the second connecting│
│ portions with the dotted sol applied thereon, so that the      │
│ second connecting portions on the inner layer are aligned with │
│ the second baffle liner portions                                │
└─────────────────────────────────────────────────────────────────┘
                                │
                                ▼
┌─────────────────────────────────────────────────────────────────┐
│ Press the inner layer and the second baffle liner portions     │
│ which are superimposed together                                 │
└─────────────────────────────────────────────────────────────────┘
                                │
                                ▼
┌─────────────────────────────────────────────────────────────────┐
│ Connect the first baffle liner portions bonded to the outer    │
│ layer with the second baffle liner portions bonded to the      │
│ inner layer                                                     │
└─────────────────────────────────────────────────────────────────┘
```

FIG. 7

APPLICATION OF DISPENSING PROCESS IN GARMENTS, SLEEPING BAGS AND OTHER SEWN PRODUCTS

TECHNICAL FIELD

The present application relates to a fabric layer and in particular to a fabric layer used for clothes, sports equipment and the like.

BACKGROUND OF THE PRESENT INVENTION

For the conventional fabric layers in which a stuffing is filled, the inner layer and the outer layer are connected by stitching, so that a chamber formed by adjacent stitching lines, the inner layer and the outer layer to accommodate the stuffing. In the case of such conventional fabric layers, the stuffing (e.g., down, cotton, etc.) is easy to leak out of the outer layer through the stitching lines so that the stuffing shortage of the product is existed and it is unaesthetic. Moreover, in a case where the outer layer is a waterproof outer layer, the waterproof performance of the product may be affected.

SUMMARY OF THE PRESENT INVENTION

The present application provides a fabric layer to overcome the above deficiencies, wherein an outer layer and an inner layer of the fabric layer are connected by a plurality of hot-melt dotted sol, so that no stitching process is used between the inner layer and the inner of the fabric layer, so that the windproof, waterproof and down-proof effects can be achieved without the stitching lines.

Further, the dotted sol is arranged in one or more rows along the first fabric layer connecting portions or the second fabric layer connecting portions The present invention further provides a method for manufacturing fabric layer, the fabric layer includes an outer layer and an inner layer, a plurality of first connecting portions are arranged on the outer layer, and a plurality of second connecting portions are arranged on the inner layer; wherein, the method including steps of: applying, by the nozzle of the dotted sol dispenser, the dotted sol onto the second connecting portions on the inner layer; placing the outer layer on the inner layer, so that the first connecting portions on the outer layer are aligned with the second connecting portions on the inner layer and the dotted sol are applied between the first connecting portions and the second connecting portions; pressing, by the pressure device of the dotted sol dispenser, the overlapped outer layer and the inner layer. Further, the dotted sol is selected from quick-drying glue or slow-drying glue; when quick-drying glue is selected as the dotted sol, the dotted sol for bonding the baffle liners to the outer layer or the inner layer is heated to the temperature ranges from 130° C. to 180° C. when applied, and the outer layer and the inner layer are pressed for 6 to 8 seconds by the pressure device, the pressure device being heated to 80° C.; and, when slow-drying glue is selected as the dotted sol, the dotted sol for bonding the outer layer to the inner layer is heated to no more than 100° C. when applied, and the outer layer and the inner layer are pressed for 4 seconds by the pressure device.

The present invention further provides a method for manufacturing fabric layer, the fabric layer includes an outer layer, an inner layer, and a plurality of baffle liners which are arranged at intervals between the outer layer and the inner layer, a plurality of first connecting portions are arranged on the outer layer, and a plurality of second connecting portions are arranged on the inner layer; each of the baffle liners including an upright portion, and a first baffle liner connecting portion and a second baffle liner connecting portion which are located at two ends of the upright portion; and, each of the baffle liners is also divided into a first baffle liner portion and a second baffle liner portion, the first baffle liner portion at least including the first baffle liner connecting portion and the second baffle liner portion at least including the second baffle liner connecting portion; wherein, the method including steps of: applying, by the nozzle of the dotted sol dispenser, the dotted sol onto the first connecting portions on the outer layer and the second connecting portions on the inner layer; placing the first baffle liner portions on the first connecting portions with the dotted sol applied thereon, so that the first connecting portions on the outer layer are aligned with the first baffle liner connecting portions; pressing, by the pressure device of the dotted sol dispenser, the overlapped outer layer and the first baffle liners; placing the second baffle liner portions on the second connecting portions with the dotted sol applied thereon, so that the second connecting portions on the inner layer are aligned with the second baffle liner connecting portions; pressing, by the pressure device of the dotted sol dispenser, the overlapped inner layer and the second baffle liner portions; and, connecting the first baffle liner portions bonded to the outer layer with the second baffle liner portions bonded to the inner layer again. Further, the dotted sol is selected from quick-drying glue or slow-drying glue; when quick-drying glue is selected as the dotted sol, the dotted sol for bonding the baffle liners to the outer layer or the inner layer is heated to the temperature ranges from 130° C. to 180° C. when applied, and the outer layer and the inner layer are pressed for 6 to 8 seconds by the pressure device, the pressure device being heated to 80° C.; and, when slow-drying glue is selected as the dotted sol, the dotted sol for bonding the baffle lines to the outer layer or the inner layer is heated to no more than 100° C. when applied, and the outer layer and the inner layer are pressed for 4 seconds by the pressure device.

The present application provides a fabric layer, including: an outer layer on which a plurality of first connecting portions are arranged; and, an inner layer on which a plurality of second connecting portions are arranged, wherein the first connecting portions on the outer layer are bonded to the corresponding second connecting portions on the inner layer to form fabric layer connecting portions via dotted sol, so that a chamber is formed by every two adjacent fabric layer connecting portions, the outer layer and the inner layer to accommodate a stuffing.

Further, the dotted sol is selected from quick-drying glue or slow-drying glue; when quick-drying glue is selected as the dotted sol, the dotted sol for bonding the outer layer to the inner layer is heated to the temperature ranges from 130° C. to 180° C. when applied, and the outer layer and the inner layer are pressed for 6 to 8 seconds by a pressure device, the pressure device being heated to 80° C.; and, when slow-drying glue is selected as the dotted sol, the dotted sol for bonding the outer layer to the inner layer is heated to no more than 100° C. when applied, and the outer layer and the inner layer are pressed for 4 seconds by the pressure device.

Further, the dotted sol is arranged like dots at intervals along the fabric layer connecting portions.

Further, the dotted sol is arranged in one or more rows along the fabric layer connecting portions.

The present application further provides a fabric layer, including: an outer layer on which a plurality of first connecting portions are arranged; an inner layer on which a plurality of second connecting portions are arranged; and, a plurality of baffle liners which are arranged at intervals between the outer layer and the inner layer, each of the baffle liners including an upright portion, and a first baffle liner connecting portion and a second baffle liner connecting portion which are located at two ends of the upright portion, wherein the first baffle liner connecting portion of each of the baffle liners is bonded to the corresponding first connecting portion on the outer layer by dotted sol to form a first fabric layer connecting portion, and the second baffle liner connecting portion of each of the baffle liners is bonded to the corresponding second connecting portion on the inner layer by dotted sol to form a second fabric layer connecting layer, so that a chamber is formed by every two adjacent baffle liners, the outer layer and the inner layer to accommodate a stuffing.

Further, the dotted sol is selected from quick-drying glue or slow-drying glue; when quick-drying glue is selected as the dotted sol, the dotted sol for bonding the baffle liners to the outer layer or the inner layer is heated to the temperature ranges from 130° C. to 180° C. when applied, and the outer layer and the inner layer are pressed for 6 to 8 seconds by a pressure device, the pressure device being heated to 80° C.; and, when slow-drying glue is selected as the dotted sol, the dotted sol for bonding the vertical lines to the outer layer or the inner layer is heated to no more than 100° C. when applied, and the baffle liners or the outer layer or the inner layer are pressed for 4 seconds by the pressure device.

Further, the dotted sol is arranged like dots at intervals along the first fabric layer connecting portions or the second fabric layer connecting portions.

Further, the dotted sol is arranged in one or more rows along the first fabric layer connecting portions or the second fabric layer connecting portions.

The present invention further provides a method for manufacturing fabric layer, the fabric layer includes an outer layer and an inner layer, a plurality of first connecting portions are arranged on the outer layer, and a plurality of second connecting portions are arranged on the inner layer; wherein, the method including steps of: applying, by the nozzle of the dotted sol dispenser, the dotted sol onto the second connecting portions on the inner layer; placing the outer layer on the inner layer, so that the first connecting portions on the outer layer are aligned with the second connecting portions on the inner layer and the dotted sol are applied between the first connecting portions and the second connecting portions; pressing, by the pressure device of the dotted sol dispenser, the overlapped outer layer and the inner layer. Further, the dotted sol is selected from quick-drying glue or slow-drying glue; when quick-drying glue is selected as the dotted sol, the dotted sol for bonding the baffle liners to the outer layer or the inner layer is heated to the temperature ranges from 130° C. to 180° C. when applied, and the outer layer and the inner layer are pressed for 6 to 8 seconds by the pressure device, the pressure device being heated to 80° C.; and, when slow-drying glue is selected as the dotted sol, the dotted sol for bonding the outer layer to the inner layer is heated to no more than 100° C. when applied, and the outer layer and the inner layer are pressed for 4 seconds by the pressure device.

The present invention further provides a method for manufacturing fabric layer, the fabric layer includes an outer layer, an inner layer, and a plurality of baffle liners which are arranged at intervals between the outer layer and the inner layer, a plurality of first connecting portions are arranged on the outer layer, and a plurality of second connecting portions are arranged on the inner layer; each of the baffle liners including an upright portion, and a first baffle liner connecting portion and a second baffle liner connecting portion which are located at two ends of the upright portion; and each of the baffle liners is also divided into a first baffle liner portion and a second baffle liner portion, the first baffle liner portion at least including the first baffle liner connecting portion and the second baffle liner portion at least Including the second baffle liner connecting portion; wherein, the method including steps of: applying, by the nozzle of the dotted sol dispenser, the dotted sol onto the first connecting portions on the outer layer and the second connecting portions on the inner layer; placing the first baffle liner portions on the first connecting portions with the dotted sol applied thereon, so that the first connecting portions on the outer layer are aligned with the first baffle liner connecting portions; pressing, by the pressure device of the dotted sol dispenser, the overlapped outer layer and the first baffle liners; placing the second baffle liner portions on the second connecting portions with the dotted sol applied thereon, so that the second connecting portions on the inner layer are aligned with the second baffle liner connecting portions; pressing, by the pressure device of the dotted sol dispenser, the overlapped inner layer and the second baffle liner portions; and, connecting the first baffle finer portions bonded to the outer layer with the second baffle liner portions bonded to the inner layer again. Further, the dotted sol is selected from quick-drying glue or slow-drying glue, when quick-drying glue is selected as the dotted sol, the dotted sol for bonding the baffle liners to the outer layer or the inner layer is heated to the temperature ranges from 130° C.; to 180° C. when applied, and the outer layer and the inner layer are pressed for 6 to 8 seconds by the pressure device, the pressure device being heated to 80° C.; and, when slow-drying glue is selected as the dotted sol, the dotted sol for bonding the baffle lines to the outer layer or the inner layer is heated to no more than 100° C. when applied, and the outer layer and the inner layer are pressed for 4 seconds by the pressure device.

The present application further provides a sleeping bag, including: a sleeping bag upper piece and a sleeping bag lower piece, the sleeping bag upper piece and the sleeping bag lower piece being integrally formed or connected together by a zip fastener, wherein each of the sleeping bag upper piece and the sleeping bag lower piece is formed from the fabric layer described above.

The present invention has the following beneficial effects. In the present invention, the outer layer and the inner layer of the fabric layer are connected by hot-melting dotted sol, so that no stitching process is used between the inner layer and the inner of the fabric layer. Accordingly, the stitches caused by the stitching lines are reduced, the risk of leaking down through the stitches is avoided, and the windproof, waterproof and down-proof effects are achieved. The outdoor sports equipment (e.g., sleeping bags, tents, or even down jackets, cotton jackets, outdoor jackets, etc.) formed from the fabric layer of the present application can be waterproof and moisture-proof in a humid environment, and can reduce heat toss. The fabric layer of the present invention is novel in structure, aesthete in appearance, comfortable, good in warmth retention, and is particularly suitable for (e.g., outdoor mountaineering, exploration, scientific investigation, etc.) alpine ad humid areas.

BRIEF DESCRIPTION OF THE DRAWINGS

FIG. 7 is a flowchart of manufacturing the fabric layer according to the second embodiment of the present application.

in which:

10, 10': fabric layer;
101: fabric layer connecting portion;
101a: first fabric layer connecting portion;
101b: first fabric layer connecting portion;
1: outer layer;
11: first connecting portion;
2: inner layer;
21: second connecting portion;
3: baffle liner;
3a: first baffle liner portion;
3b: second baffle liner portion;
31: first baffle liner connecting portion;
32: second baffle liner connecting portion;
33: upright portion;
4: chamber;
201: nozzle;
100: sleeping bag;
110: sleeping bag upper piece;
120: sleeping bag lower piece; and
130: zip fastener.

DETAILED DESCRIPTION OF THE PRESENT INVENTION

The technical solutions in the embodiments of the present application will be described below in detail with reference to the accompanying drawings in the embodiments of the present application. It is to be noted that, the embodiments in the present application and the features in the embodiments can be combined if not conflicted.

Embodiment 1

Figure 1:
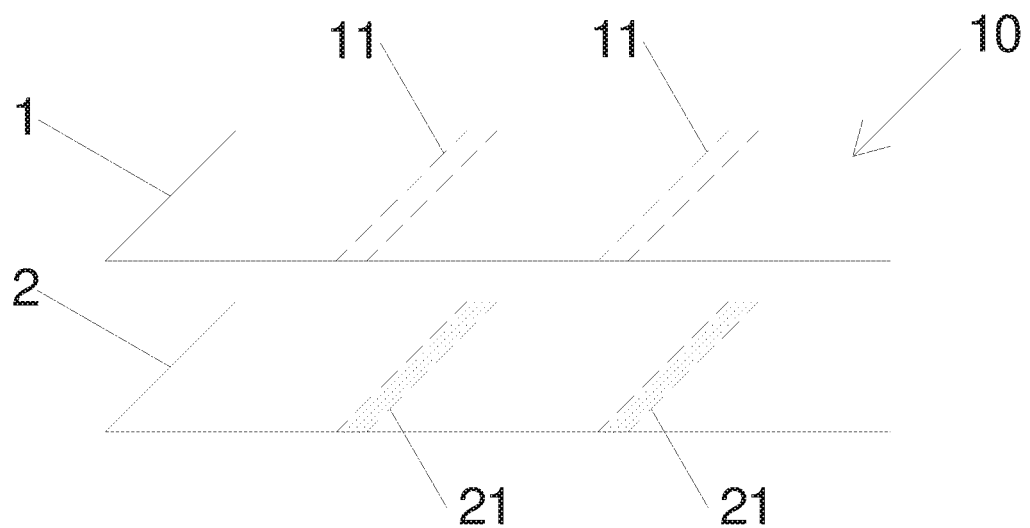
FIG. 1 is an exploded view of a fabric layer according to a first embodiment of the present application.
Figure 2:
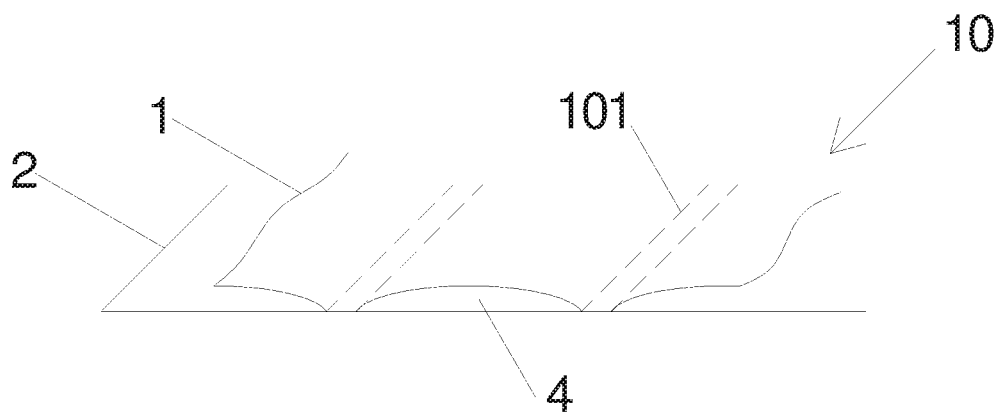
FIG. 2 is a schematic view of the fabric layer of FIG. 1, where the outer layer and the inner layer are bonded by dotted sol.

As shown in FIGS. 1 and 2, the present application discloses a fabric layer 10. The fabric layer 10 includes an outer layer 1 and an inner layer 2. A plurality of first connecting portions 11 are arranged on the outer layer 1, and a plurality of second connecting portions 21 are arranged on the inner layer 2.

The first connecting portions 11 on the outer layer 1 are bonded to the corresponding second connecting portions 21 on the inner layer 2 by dotted sol to form fabric layer connecting portions 101, so that a chamber 4 is formed by every two adjacent fabric layer connecting portions 101, the outer layer 1 and the inner layer 2 to accommodate a stuffing (e.g., down, cotton, etc.). The material for the stuffing is not specifically limited. With such an arrangement, a plurality of chambers are formed inside the fabric layer. Since the fabric layer connecting portions are formed by applying the dotted sol, the stitches of stitching lines can be avoided, and the stuffing is effectively prevented from leaking out from the stitches.

Figure 5:
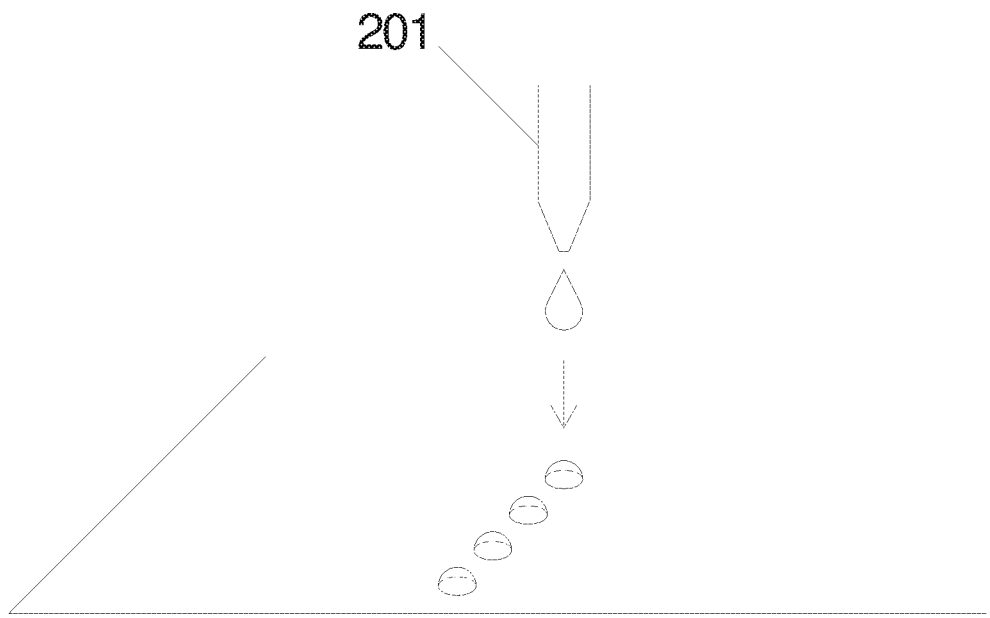
FIG. 5 is a view schematically showing application of dotted sol on the inner layer or the outer layer according to the present application.

The dotted sol for bonding the outer layer 1 to the inner layer 2 is heated when applied, that is to say, when the dotted sol is applied or dropped, for example, by a nozzle 201 (shown in FIG. 5) of a dotted sol dispenser (not shown), the dropped dotted sol has been heated to a certain temperature. The dotted sol may be commercially available quick-drying glue (e.g., quick-drying glue of the FASSO® PUR TW8099 type, etc.) or slow-drying glue. In a case where the dotted sol is quick-drying glue, a charging drum for the quick-drying glue is heated to about 130° C., a flow channel for the quick-drying glue is heated to about 180° C., and the quick-drying glue flows from the charging drum to the nozzle through the flow channel, so that the dotted glue is heated to about 130° C. to 180° C. when applied. In a case where the dotted sol is slow-drying glue, a charging drum for the slow-drying glue is heated to no more than 100° C., and a flow channel for the slow-drying glue is heated to no more than 100° C. Optionally, it is also possible to maintain the charging drum and the flow channel at the room temperature without heating (mainly depending upon the viscosity of the slow-drying glue and the glue outlet smoothness of the dispensing valve), so that the dotted sol should not exceed 100° C. during application. Such arrangement of the temperature is advantageous for the dotted sol to firmly connect the outer layer and the inner layer. In addition, the dotted sol can also realize the connection of the outer layer and the inner layer at the room temperature.

The dotted sol is arranged like dots at intervals along the fabric layer connecting portions 101. Such dot-like arrangement at intervals is advantageous to enhance the strength of connection at the fabric layer connecting portions 101.

The dotted sol is arranged in one or more rows along the fabric layer connecting portions 101. As shown in FIG. 1, the dotted sol arranged in three rows is schematically shown. However, the specific arrangement of the dotted sol is not limited thereto.

Figure 6:
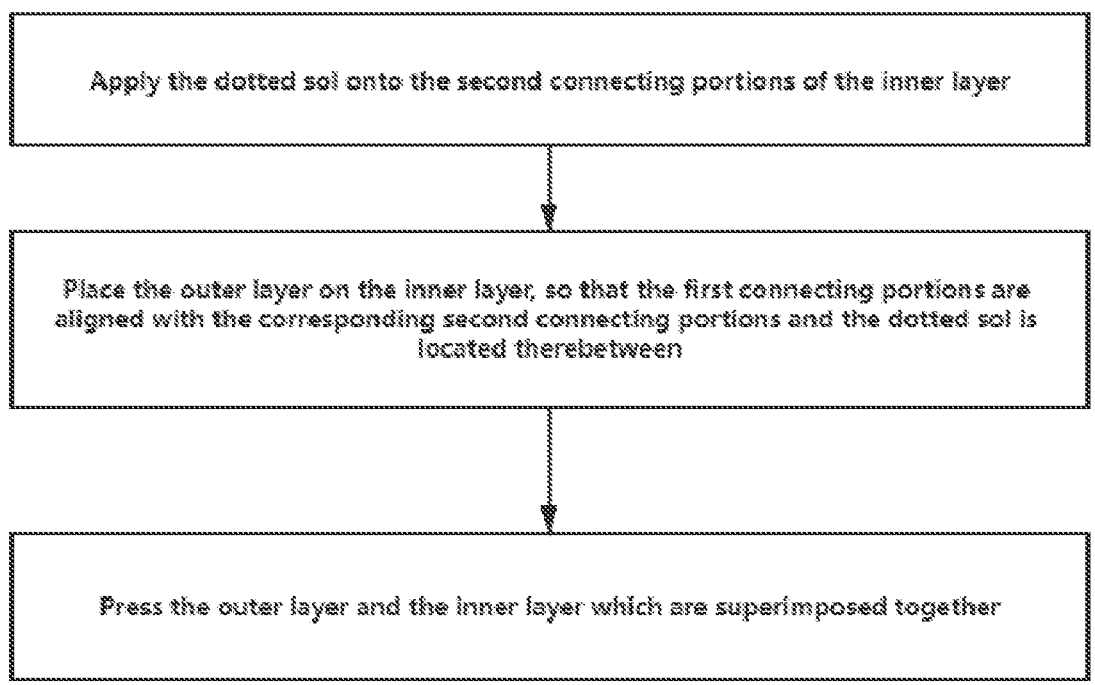
FIG. 6 is a flowchart of manufacturing the fabric layer according to the first embodiment of the present application.

As shown in the flowchart of FIG. 6, a method for manufacturing the fabric layer 10 is shown. The method may include steps of: applying, by the nozzle 201 of the dispenser, the dotted sol onto the second connecting portions 21 on the inner layer 2; placing the outer layer 1 on the inner layer 2, so that the first connecting portions 11 on the outer layer 1 are aligned with the corresponding second connecting portions 21 on the inner layer 2 and the dotted sol is located between the first connecting portions 11 and the second connecting portions 21; and, pressing, by the pressure device (not shown) of the dispenser, the overlapped outer layer 1 and the inner layer 2. The pressure device may be a conventional pressure device, for example, a plate-type pressure element. Both the pressure device and the nozzle 201 may be integrated on the dispenser.

When quick-drying glue is selected as the dotted sol, the dotted sol for bonding the outer layer 1 to the inner layer 2 is heated to the temperature ranges from 130° C. to 180° C. when applied, and the outer layer 1 and the inner layer 2 are pressed for 6 to 8 seconds by the pressure device, the pressure device being heated to 80° C.; and, when slow-drying glue is selected as the dotted sol, the dotted sol for bonding the outer layer 1 to the inner layer 2 is heated to no more than 100° C. when applied, and the outer layer 1 and the inner layer 2 are pressed for 4 seconds by the pressure device, where the pressure device may not be heated. In this way, the outer layer and the inner layer can be connected firmly by the dotted sol.

Embodiment 2

Figure 3:
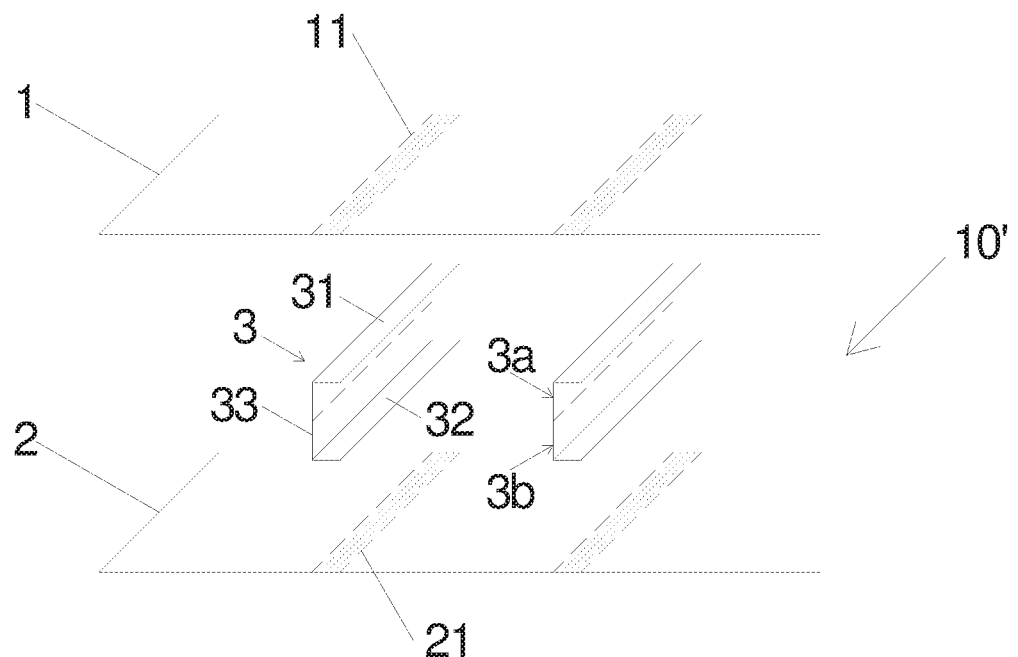
FIG. 3 is an exploded view of a fabric layer according to a second embodiment of the present application.
Figure 4:
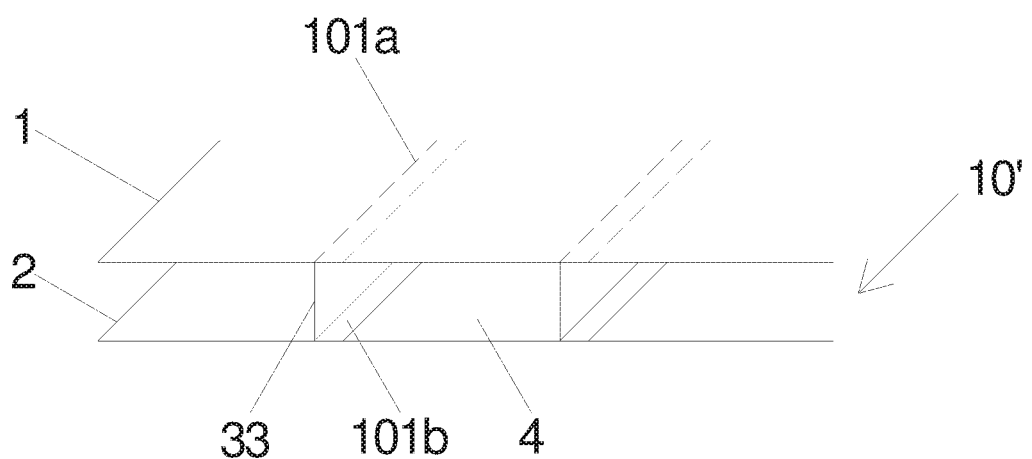
FIG. 4 is a schematic view of the fabric layer of FIG. 2, where the outer layer, the inner layer and the baffle liners are bonded by dotted sol.

As shown in FIGS. 3 and 4, the present application further discloses a fabric layer 10'. The fabric layer 10' may include an outer layer 1, an inner layer 2 and a plurality of baffle liners 3. A plurality of first connecting portions 11 are arranged on the outer layer 1, and a plurality of second connecting portions 21 are arranged on the inner layer 2. A plurality of baffle liners 3 are arrange at intervals between the outer layer 1 and the inner layer 2. Each of the baffle liners 3 includes an upright portion 33, and a first baffle liner connecting portion 31 and a second baffle liner connecting portion 32 which are located at two ends of the upright portion 33; and, each of the baffle liners 3 is also divided into a first baffle liner portion 3a and a second baffle liner portion 3b, the first baffle liner portion 3a at least including the first baffle liner connecting portion 31 and the second baffle liner portion 3b at least including the second baffle liner connecting portion 32.

The first baffle liner connecting portion 31 of each of the baffle liners 3 is bonded to the corresponding first connecting portion 11 on the outer layer 1 by dotted sol to form a first fabric layer connecting portion 101a, and the second baffle liner connecting portion 32 of each of the baffle liners 3 is bonded to the corresponding second connecting portion 21 on the inner layer 2 by dotted sol to form a second fabric layer connecting portion 101b, so that a chamber 4 is formed by every two adjacent baffle liners 3, the outer layer 1 and the inner layer 2 to accommodate a stuffing (e.g., down, cotton, etc.). The material for the stuffing is not specifically limited. Similar to the Embodiment 1, with such an arrangement, since the first and second fabric layer connecting portions are formed by applying the dotted sol, the stitches of stitching lines is avoided, and the stuffing is effectively prevented from leaking out from the stitches. Meanwhile, due to the arrangement of the baffle liners, there are more space in the chambers, which is helpful to accommodate the stuffing therein, and the fabric layer is more stereoscopic and aesthetic as a whole. FIG. 3 exemplarily shows the baffle liners 3, but the specific shape of the baffle liners is not limited thereto. For example, the upright portion of each of the baffle liners may be located in the middle of the first baffle liner connecting portion 31 or the second baffle liner connecting portion 32, or located at any other position.

Similar to the Embodiment 1, when quick-drying glue is selected as the dotted sol, the dotted sol for bonding the baffle liners 3 to the outer layer 1 or the inner layer 2 is heated to the temperature ranges from 130° C. to 180° C. when applied, and the outer layer 1 and the inner layer 2 are pressed for 6 to 8 seconds by the pressure device, the pressure device being heated to 80° C.; and, when slow-drying glue is selected as the dotted sol, the dotted sol for bonding the baffle liners 3 to the outer layer 1 or the inner layer 2 is heated to no more than 100° C. when applied, and the baffle liners 3 and the outer layer 1 or the inner layer 2 are pressed for 4 seconds by the pressure device.

The dotted sol may be arranged like dots at intervals along the first fabric layer connecting portions 101a or the second fabric layer connecting portions 101b.

The dotted sol may be arranged in one or more rows along the first fabric layer connecting portions 101a or the second fabric layer connecting portions 101b.

As shown in the flowchart of FIG. 7, a method for manufacturing the fabric layer 10' is shown. The method may include steps of: applying, by the nozzle 201 of the dotted sol dispenser, the dotted sol onto the first connecting portions 11 on the outer layer 1 and the second connecting portions 21 on the inner layer 2; placing the first baffle liner portions 3a on the first connecting portions 11 with the dotted sol applied thereon, so that the first connecting portions 11 on the outer layer 1 are aligned with the first baffle liner connecting portions 31; pressing, by the pressure device of the dotted sol dispenser, the overlapped outer layer 1 and the first baffle liners 31; placing the second baffle liner portions 3b on the second connecting portions 21 with the dotted sol applied thereon, so that the second connecting portions 21 on the inner layer 2 are aligned with the second baffle liner connecting portions 32; pressing, by the pressure device of the dotted sol dispenser, the overlapped inner layer 2 and the second baffle liner portions 3b; and, connecting the first baffle liner portions 3a bonded to the outer layer 1 with the second baffle liner portions 3b bonded to the inner layer 2 again. The connection method of connecting the first baffle liner portions 3a with the second baffle liner portions 3b is not limited, and may be sewing, bonding or the like.

Figure 8:
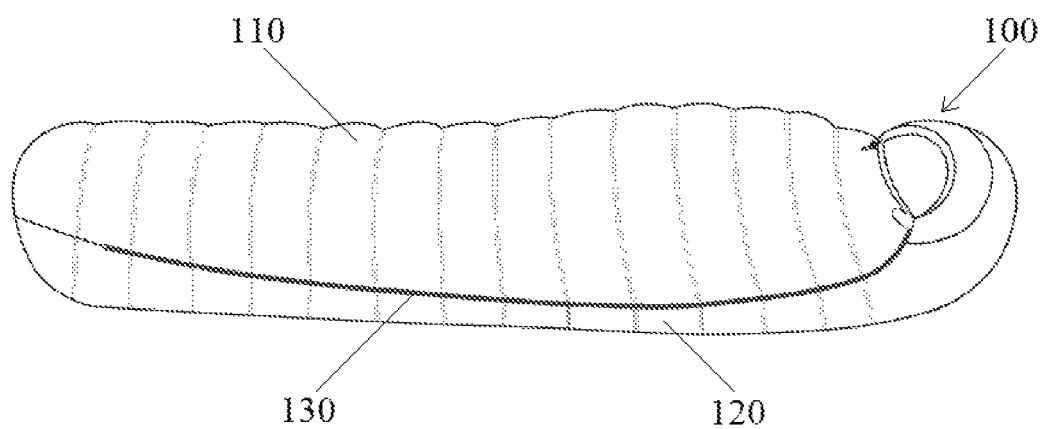
FIG. 8 shows a sleeping bag formed from the fabric layer according to the present application.

As shown in FIG. 8, a sleeping bag 100 formed from the fabric layer is shown. The sleeping bag 100 includes a sleeping bag upper piece 110 and a sleeping bag lower piece 120, wherein the sleeping bag upper piece 110 and the sleeping bag lower piece 120 are integrally formed or connected together in other ways, for example, by a connector such as a zip fastener 130. Each of the sleeping bag upper piece 110 and the sleeping bag lower piece 120 may include the fabric layer 10 or the fabric layer 10' described above and a possible stuffing. The sleeping bag shown in FIG. 8 is merely an exemplary form. The fabric layer 10 or the fabric layer 10' can be applied to any type of outdoor sports equipment such as sleeping bags and tents, and can even be applied to garments such as down jackets, cotton jackets and outdoor jackets.

The foregoing description merely shows preferred embodiments of the present application and is not intended to limit the present application. Various alterations and variations may be made to the present application by those skilled in the art. Any modifications, equivalent replacements and improvements made without departing from the spirit and principle of the present application shall fall into the protection scope of the present application.

What is claimed is:

1. A fabric layer, comprising:
   an outer layer comprising a plurality of first connecting portions; and
   an inner layer comprising a plurality of second connecting portions;
   wherein the first connecting portions on the outer layer are bonded to the corresponding second connecting portions on the inner layer by dotted sol to form fabric layer connecting portions, so that a chamber is formed by every two adjacent fabric layer connecting portions, the outer layer and the inner layer to accommodate a stuffing; with such an arrangement, a plurality of chambers are formed inside the fabric layer; the fabric layer connecting portions are formed by applying the dotted sol to avoid stitches of stitching lines, and the stuffing is effectively prevented from leaking out from the stitches; the dotted sol is applied or dropped for by a nozzle of a dispenser;
   when quick-drying glue is selected as the dotted sol, a charging drum for the quick-drying glue is heated to about 130° C., a flow channel for the quick-drying glue is heated to about 180° C., and the quick-drying glue flows from the charging drum to the nozzle through the flow channel, so that the dotted sol for bonding the outer layer to the inner layer is heated to the temperature ranges from 130° C. to 180° C. when applied, and the outer layer and the inner layer are pressed for 6 to 8 seconds by a pressure device, the pressure device being heated to 80° C.; and when slow-drying glue is selected as the dotted sol, the charging drum for the slow-drying glue is heated to no more than 100° C., and the flow channel for the slow-drying glue is heated to no more than 100° C.; the outer layer and the inner layer are pressed for 4 seconds by the pressure device;

the dotted sol is arranged in dots at intervals along the fabric layer connecting portions so that two dashed lines are formed along the first connecting portions and the second connecting portions.

2. The fabric layer according to claim 1, wherein the dotted sol is arranged in one or more rows along the fabric layer connecting portions.

3. A sleeping bag, comprising:
a sleeping bag upper piece; and
a sleeping bag lower piece;
the sleeping bag upper piece and the sleeping bag lower piece are integrally formed or connected together by a zip fastener;
wherein each of the sleeping bag upper piece and the sleeping bag lower piece is formed from the fabric layer according to claim 1.

4. The sleeping bag according to claim 3, wherein the dotted sol is arranged like dots at intervals along the fabric layer connecting portions.

5. The sleeping bag according to claim 4, wherein the dotted sol is arranged in one or more rows along the fabric layer connecting portions.

6. The sleeping bag according to claim 3, wherein the fabric layer further comprises:
an outer layer on which a plurality of first connecting portions are arranged;
an inner layer on which a plurality of second connecting portions are arranged; and
a plurality of baffle liners which are arranged at intervals between the outer layer and the inner layer, each of the baffle liners comprising an upright portion, and a first baffle liner connecting portion and a second baffle liner connecting portion which are located at two end of the upright portion,
wherein the first baffle liner connecting portion of each of the baffle liners is bonded to the corresponding first connecting portion on the outer layer by dotted sol to form a first fabric layer connecting portion, and the second baffle liner connecting portion of each of the baffle liners is bonded to the corresponding second connecting portion on the inner layer by dotted sol to form a second fabric layer connecting layer, so that a chamber is formed by every two adjacent baffle liners, the outer layer and the inner layer to accommodate a stuffing.

7. The sleeping bag according to claim 6, wherein the dotted sol is selected from the group consisting of quick-drying glue and slow-drying glue,
when quick-drying glue is selected as the dotted sol, the dotted sol for bonding the baffle liners to the outer layer or the inner layer is heated to the temperature ranges from 130° C. to 180° C. when applied, and the outer layer and the inner layer are pressed for 6 to 8 seconds by a pressure device, the pressure device being heated to 80° C.; and
when slow-drying glue is selected as the dotted sol, the dotted sol for bonding the vertical lines to the outer layer or the inner layer is heated to no more than 100° C. when applied, and the baffle liners or the outer layer or the inner layer are pressed for 4 seconds by the pressure device.

8. The sleeping bag according to claim 6, wherein the dotted sol is arranged like dots at intervals along the first fabric layer connecting portions or the second fabric layer connecting portions.

9. The sleeping bag according to claim 8, wherein the dotted sol is arranged in one or more rows along the first fabric layer connecting portions or the second fabric layer connecting portions.

* * * * *